Oct. 4, 1966

E. DENMAN 3,276,110

IMPACT DEVICE FOR REMOVING A TOOTH
FROM EXCAVATING APPARATUS

Filed July 23, 1965

INVENTOR.
ELMER DENMAN

BY Kimmel, Crowell & Weaver
ATTORNEYS.

United States Patent Office 3,276,110
Patented Oct. 4, 1966

3,276,110
IMPACT DEVICE FOR REMOVING A TOOTH FROM EXCAVATING APPARATUS
Elmer Denman, Citrus Heights, Calif.
(Rte. 1, Box 306, Lincoln, Calif. 95648)
Filed July 23, 1965, Ser. No. 474,422
2 Claims. (Cl. 29—254)

This invention relates to a device for removing a digging tooth from the edge of an earth working device, such as an excavating bucket mounted on a digging wheel or on a chain, a front end loader, a back hoe, a dredge, a dipper or any other device to which an excavating tooth may be attached.

Although the overall configuration of all excavating teeth are substantially the same, there is a great variety of means by which the digging tooth it attached to a tooth holder mounted on the edge of an excavating device. These types include vertically and horizontally positioned retaining pins, some of which contain a resilient member for retaining an excavating tooth on its associated holder.

A specific object of the invention is the provision of a tool for removing a deformed or worn tooth from an excavating bucket or the like including a frame consisting of spaced frame members extending longitudinally of a tooth and offset transverse members engageable over the tooth, a guide bar attached to the frame, an impact anvil on the guide bar and a plunger, or impact hammer, movable on the guide bar to impact the anvil and loosen the tooth.

Although certain devices have been previously proposed for removing such a tooth from a tooth holder, and particularly that shown in Patent No. 2,807,105, these devices have not proved practicable for a number of reasons. One such reason, which is true with almost any specialized tool, is that the tool can never be found when it is needed. Another disadvantage of the prying type removal tool is that while the deformed wall portion initially holds the tooth on the associated shank, after use the tooth is generally wedged so tightly on the associated shank, that the disconnection of the malleable portion of the female tooth does not effect removal thereof. Accordingly, it is necessary to use of hammer or other blunt instrument to strike the rear of the female tooth to dislodge it from the shank.

It is a primary object of the instant invention to provide a tool for removing a worn deformably mounted excavating tooth from its associated tooth holder in a single operation.

A further object of this invention is to provide a device for removing a deformably mounted tooth from its associated holder by applying a force along the rear edge of the tooth.

Another object of this invention is to provide a tool for removing a deformably mounted tooth from an associated tooth holder by applying periodic high impact forces on the rear thereof.

A still further object of this invention is to provide a tool for removing a deformably mounted tooth utilizing a reciprocable member to apply a force or high impact load on the rear of the tooth.

Another object of the instant invention is to provide a tool for removing a deformably mounted tooth from its associated tooth holder having means conveniently releasably attaching the tool to the tooth to be removed.

Still another object of the instant invention is to provide a tool for separating telescoped parts.

Other objects and advantages of the instant invention reside in the combinations of elements, arrangements of parts, and features of construction and operation, all as will be more fully pointed out hereinafter and disclosed in the acommpanying drawing wherein there is shown a preferred embodiment of this inventive concept.

Figure 1:
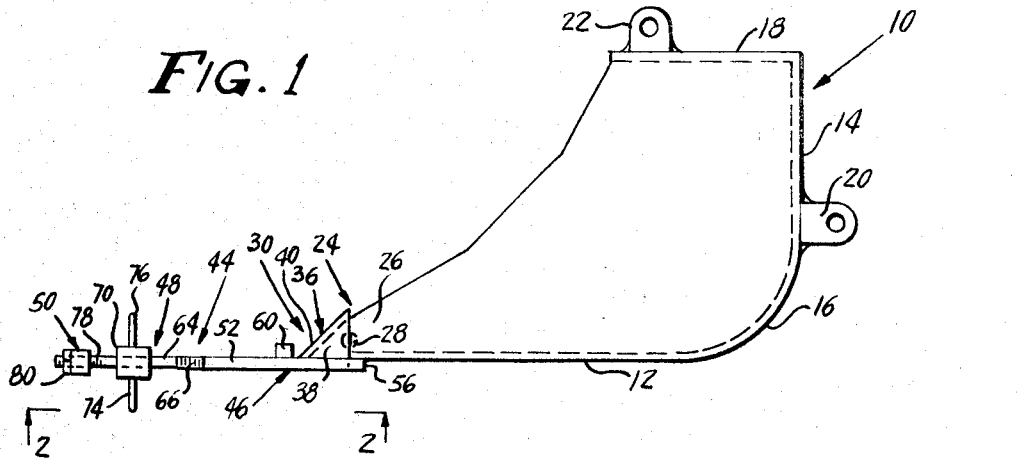
FIGURE 1 is a side elevational view of an excavating bucket having a deformably mounted tooth to which is attached the tooth removing tool of the instant invention.
Figure 2:
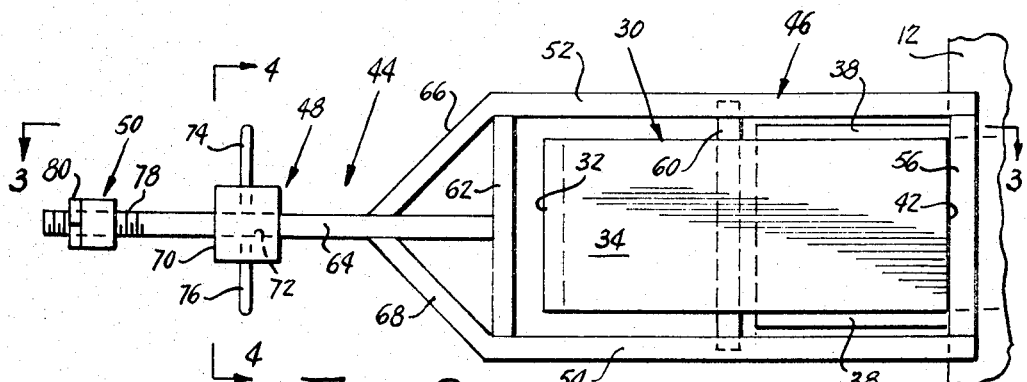
FIGURE 2 is an enlarged bottom view of the tooth removing tool and a tooth to which it is attached, all as may be seen along line 2—2 of FIGURE 1 viewing in the direction of the arrows.

Referring now to the drawing in detail, wherein like reference characters designate like elements throughout the several views thereof, there is indicated generally at 10 an excavating bucket having a substantially planar bottom wall 12 connected to a substantially vertical back wall 14 by a curved bottom 16 and provided with a top wall 18. A plurality of apertured ears, 20, 22 are provided on bucket 10 for engagement with the operating arms of a back hoe or the like. It should be understood that bucket 10 is only representative of an earth digging device to which digging teeth may be attached. Bucket 10 also includes a forward digging area indicated generally at 24 provided with a plurality of tooth receiving male shanks 26 having at least one recess 28 thereon.

A digging tooth shown generally at 30 is received on male shank 28 and includes a forwardly extending chiseled digging edge 32, a forwardly extending plate 34 connected to a female socket shown generally at 36 configured to surround shank 26. Socket 36 customarily has as its bottom wall an extension of plate 34 and is provided with a pair of upwardly extending walls 38 and a top wall 40. Upstanding walls 38 are conveniently malleable such that they may be deformed, as by striking with a ball peen hammer, to engage with recess 28 in male shank 26. It should be noted that plate 34 provides a rearwardly facing abutment 42, the use of which is more fully explained hereinafter.

While the description of tooth 30 and its connection with shank 26 is generally along the lines described in United States Patent 2,807,105, it should be understood that the utilization of the tool of the instant invention is not so limited. This tool may profitably be used with any telescoping parts secured together by a deformation of the outer component, such as are shown in United States Patents 2,870,552, 2,885,801, 2,915,290.

After tooth 30 is installed on shank 26, bucket 10 is manipulated by associated mechanical linkage to perform an earth working function which results in the abrasion and wearing away of digging edge 32 and forwardly extending plate 34. At some time during the earth working operation, it becomes economically more feasible to replace tooth 30 than to continue operation with a worn tooth.

In order to remove tooth 30 from shank 26 a tooth removing tool shown generally at 44 is provided having as its major components a tooth-receiving frame indicated generally at 46, a guide bar and impact producing means shown generally at 48, and an anvil shown generally at 50.

Tooth-receiving frame 46 includes a pair of substantially parallel planar longitudinal frame members 52, 54 having a thickness approximately equal to the maximum thickness of plate 34 of tooth 30. Securing longitudinal frame members 52, 54 together is a perpendicular frame member comprised of a transverse bar 56 lying in the plane of frame members 52, 54 providing an edge 58 facing the area between members 52, 54 and complementarily shaped with respect to rearwardly facing abutment 42 of plate 34. A transverse retaining bar 60 is secured intermediate the ends of longitudinal frame members 52, 54 and is positioned on the upper surface thereof which is spaced from the center plane of frame members 52, 54 and transverse bar 56 as may be seen in FIGURE 3.

Any suitably configured structural members may secure together the other end of longitudinal frame members 52, 54 but it is preferred to provide a transverse bar 62 secured between the ends of frame members 52, 54 and coplanar therewith. A guide bar 64 of guide bar and impact producing means 48 is secured to transverse bar 62, as by welding or the like, and is braced thereto by a pair of diagonal structural supports 66, 68. It should be noted that guide bar 64 lies in the same plane as longitudinal frame members 52, 54 impact affecting transverse bar 56 and will result in the transmission of a force calculated to remove tooth 30 from shank 26 without the creation of force vectors perpendicular thereto in order to preclude binding forces.

Slidably mounted on guide bar 64, which may be of any suitable configuration, but which is preferably cylindrical, is a plunger or impact hammer 70 having a central aperture 72 receiving guide bar 64 and a pair of transversely extending handles or ears 74, 76.

Secured on the terminal end of guide bar 64, as by providing a series of threads 78 on the end thereof, is an anvil 50 including a nut 80 internally threaded to receive threads 78 of guide bar 64. Alternatively, anvil 50 may be welded to guide bar 68 after plunger 70 has been received thereon.

In the operation of the tooth removing tool of the instant invention, bucket 10 will be elevated to a position where an individual may easily reach it with planar wall 12 being slightly upwardly inclined to elevate teeth 30. Tooth-receiving means 46 of tool 44 is mounted on tooth 30 by elevating the end of guide bar 64 such that plate 34 of tooth 30 is received between first and second transverse bars 56, 60 as will be apparent from FIGURE 3. Tool 44 is then moved toward tooth 30 until first transverse bar 56 clears rearwardly facing abutment 42 of plate 34.

Figure 3:
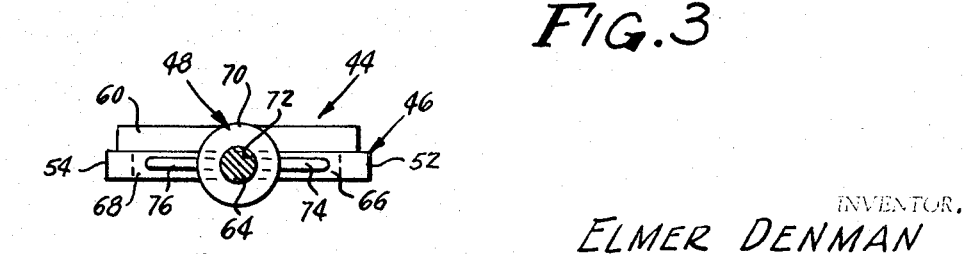
FIGURE 3 is a longitudinal cross-sectional view of the tooth removing tool of FIGURE 2 taken along line 3—3 thereof and viewing in the direction of the arrows.
Figure 4:
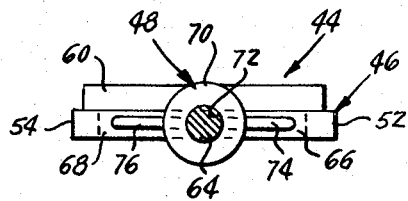
FIGURE 4 is a transverse cross-sectional view of the tooth removing tool of FIGURE 2, taken along line 4—4 and viewing in the direction of the arrows.

Tool 44 is then allowed to rotate in a counter-clockwise direction, as shown in FIGURE 3, such that second transverse bar 60 resides on the upper surface of plate 34. It will be noted that tool 44 will remain in place because of the counter-clockwise moment produced by tool 44 and the restraining effects of first transverse bar 56 in engagement with male shank 26 and second transverse bar 60 in engagement with plate 34.

An attendant may then grasp ears 74, 76 of impact producing means 48 and reciprocate plunger 70 to periodically strike anvil 50 thus creating an impact force transmitted along guide bar 64 and longitudinal frame members 52, 54 to impact first transverse bar 56 against rearwardly facing shoulder 42 of tooth 30. It will be apparent that repeated impacts of plunger 70 against nut 80 will loosen the deformed connection between upstanding walls 38 of female socket 36 and recess 28 of male shank 26.

It is now seen that there is herein provided an improved tool for separating telescoping parts, having all of the advantages of this invention and others, including many advantages of great practical utility and commercial importance.

Since many embodiments may be made of the instant inventive concept, and since many modifications may be made of the embodiment hereinbefore shown and described, it is to be understood that the foregoing is to be interpreted merely as illustrative and not in a limiting sense.

I claim:

1. A tool for removing an excavating tooth having a female socket from a male shank of an excavating device, comprising means for receiving said tooth and means for applying a force to said tooth receiving means for separating said socket from said shank, said tool having a generally longitudinal axis and said tooth receiving means including at least a pair of frame members extending generally in the direction of said axis spaced apart to receive said tooth therebetween, a first transverse bar secured adjacent one end of said frame members and a second transverse bar secured intermediate the ends of said frame members.

2. A tool for separating telescoping parts having a female component and a male component comprising means for receiving said female component including at least a pair of spaced apart frame members lying in a common plane, a first transverse bar secured to said frame members adjacent one end of said frame members and a second transverse bar spaced intermediate said frame members and means for applying an impact force to said first transverse bar having a force vector extending generally from said first transverse bar toward said second transverse bar.

References Cited by the Examiner

UNITED STATES PATENTS

| | | | |
|---|---|---|---|
| 1,482,694 | 2/1924 | Neill | 29—261 |
| 1,627,477 | 5/1927 | Blume et al. | 29—254 X |
| 1,873,294 | 8/1932 | Cosgrove | 29—254 |
| 2,450,293 | 9/1948 | Oserowsky | 29—270 |
| 2,629,985 | 3/1953 | McDowell | 173—91 |
| 2,779,089 | 1/1957 | Allen | 29—254 |
| 2,807,105 | 9/1957 | Launder | 37—142 |
| 3,003,230 | 10/1961 | Fornes | 29—254 |
| 3,106,012 | 10/1963 | Comer | 29—254 |

WILLIAM FELDMAN, *Primary Examiner.*

MYRON C. KRUSE, *Examiner.*